United States Patent
Houweling

(10) Patent No.: US 8,532,651 B2
(45) Date of Patent: Sep. 10, 2013

(54) METHOD OF REJECTING RADIO LINKS BASED ON TIMING INFORMATION REGARDING A DETECTED CELL

(75) Inventor: Tony Houweling, Alpharetta, GA (US)

(73) Assignee: Alcatel Lucent, Paris (FR)

( * ) Notice: Subject to any disclaimer, the term of this patent is extended or adjusted under 35 U.S.C. 154(b) by 194 days.

(21) Appl. No.: 12/956,397

(22) Filed: Nov. 30, 2010

(65) Prior Publication Data

US 2012/0135727 A1    May 31, 2012

(51) Int. Cl.
*H04W 4/00* (2009.01)
(52) U.S. Cl.
USPC ............................ 455/434; 455/436; 455/437
(58) Field of Classification Search
USPC ......................................... 455/434, 436, 437
See application file for complete search history.

(56) References Cited

U.S. PATENT DOCUMENTS

| | | | | |
|---|---|---|---|---|
| 2003/0003919 A1* | 1/2003 | Beming et al. | ................ | 455/446 |
| 2006/0223538 A1* | 10/2006 | Haseba et al. | ................ | 455/436 |
| 2009/0137246 A1* | 5/2009 | Xing et al. | .................... | 455/434 |
| 2010/0260155 A1* | 10/2010 | Grilli et al. | .................... | 370/336 |
| 2012/0021745 A1* | 1/2012 | Tu | ................. | 455/436 |
| 2012/0163338 A1* | 6/2012 | Zhang et al. | ................. | 370/331 |

* cited by examiner

*Primary Examiner* — Barry W Taylor
(74) *Attorney, Agent, or Firm* — Carlson, Gaskey & Olds PC

(57) ABSTRACT

An exemplary method of controlling wireless communications includes providing a list of cell identifiers to a mobile station. The list comprises a target active set of a controller that indicates candidate cells for possible communication with the mobile station. An indication received from the mobile station indicates that the mobile station has detected a cell identifier on the provided list. A determination is made whether timing information regarding the cell corresponding to the detected cell identifier is within a predetermined acceptable range. The cell corresponding to the detected cell identifier is allowed to remain in the controller target active set and added to the active set of the mobile station only if the determined timing information is within the predetermined acceptable range.

23 Claims, 2 Drawing Sheets

METHOD OF REJECTING RADIO LINKS BASED ON TIMING INFORMATION REGARDING A DETECTED CELL

FIELD OF THE INVENTION

This invention generally relates to communication. More particularly, this invention relates to wireless communication.

DESCRIPTION OF THE RELATED ART

Wireless communication systems have increased in popularity and capability. More features and coverage areas are being added to wireless communication systems on a routine basis. One aspect of increasing wireless communication coverage that remains a challenge is that the number of cell identifiers (i.e., scrambling codes or pseudo-random noise offsets) is limited. For example, UMTS networks have a pool of 512 primary scrambling codes available. As more sectors and cells are added, it becomes increasingly necessary to reuse cell identifiers. In general, cell identifiers are reused for cells that are as far away from each other as possible.

The reuse of cell identifiers introduces difficulties in various situations. For example, in densely populated urban areas the isolation between cells reusing the same cell identifier may not be enough to prevent a mobile station (a.k.a. UE) from detecting the cell identifier of the one of those cells that is too far away for reliable communications. A mobile station may be at a higher elevation than many base stations and would have a clear line of sight to many, relatively far away sectors. If the mobile station detects such far away cells or sectors that have a reused cell identifier, this can pose problems in establishing an active set for the mobile station to use during handover, for example.

A radio network controller (RNC) may receive an indication regarding a cell identifier detected by a mobile station via a radio link addition measurement report. If that reported cell identifier is erroneously matched by the RNC to a neighboring cell to the currently serving active cell set for that mobile station, the RNC may proceed to set up and add a radio link to that sector. The problem is that the mobile station did not detect the provisioned neighboring cell but, instead, detected a far away cell with a reused cell identifier. When the radio link is added for that sector, there are several undesirable effects. The downlink power for all serving radio links may be incorrectly estimated due to the addition of the erroneous new radio link. That tends to degrade the Block Error Rate and may cause the power control to increase downlink power starving away power to serve other radio links carrying other user traffic and may even cause radio links to fail in the cell resulting in an increase in dropped calls in the cell. Additional potential problems include a jump in cell frame number, a failure to achieve uplink synchronization, failure to add the radio link and ciphering mismatches.

SUMMARY

An exemplary method of controlling wireless communications includes providing a list of cell identifiers to a mobile station. The list comprises a target active set of a controller that indicates candidate cells for possible communication with the mobile station. An indication received from the mobile station indicates that the mobile station has detected a cell identifier on the provided list. A determination is made whether timing information regarding the cell corresponding to the detected cell identifier is within a predetermined acceptable range. The cell corresponding to the detected cell identifier is allowed to remain in the target active set of the controller and to be added to the active set of the mobile station only if the determined timing difference between reported timing information from the mobile station and the base station is within the predetermined acceptable range.

The various features and advantages of the disclosed example will become apparent to those skilled in the art from the following detailed description. The drawings that accompany the detailed description can be briefly described as follows.

DETAILED DESCRIPTION

Figure 1:
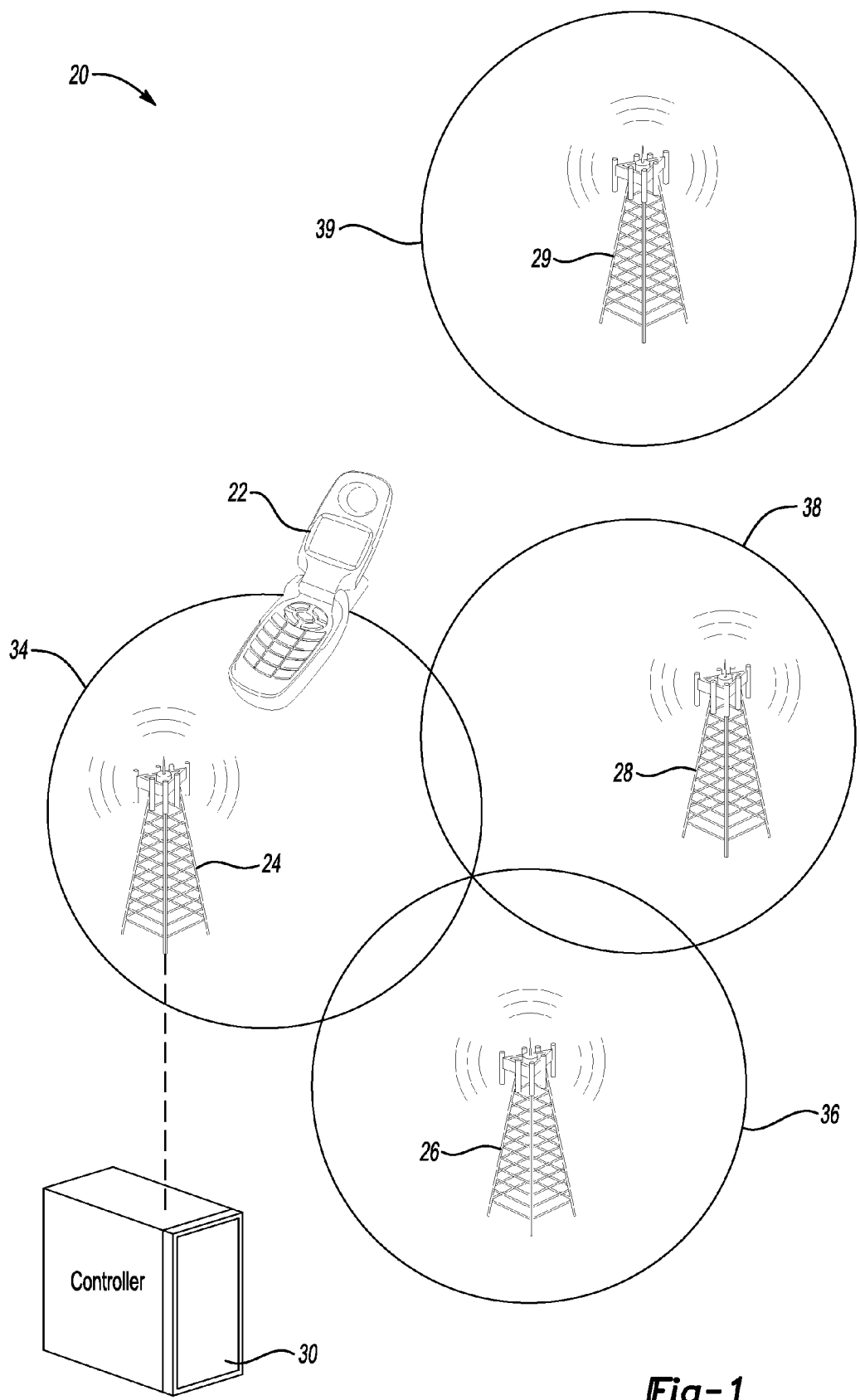
FIG. 1 schematically illustrates selected portions of an example communication system.

FIG. 1 schematically shows selected portions of an example wireless communication system 20. A mobile station 22 and a plurality of radio base stations 24, 26, 28 and 29, which have a corresponding cell 34, 36, 38 and 39, respectively, are illustrated for discussion purposes. The mobile station 22 is currently served by the cell 34. The mobile station 22 is also within measurement range of the cells 38 and 39. The cell identifiers (e.g., primary scrambling codes or pseudo-random noise offsets) of the cells 34, 36 and 38 are all different from each other. In this example, the cell 39 has the same identifier as the cell 36.

A network controller 30, which is a radio network controller (RNC) in one example, determines a list of neighbor cells that are candidates to become the serving cell for the mobile station 22 during a handover. This list is a monitored list that comprises a target active set of the controller 30 that indicates which cells are candidates for communication with the mobile station 22. The network controller 30 has provisioned information regarding which cells of the system 20 are located near each other and the cell identifier of such cells. The network controller 30 provides a list to the mobile station 22, through the radio base station 24 of the serving cell 34, indicating which cell identifiers are to be considered possible candidates for inclusion in an active set for the mobile station 22.

A problem may exist if the mobile station 22 detects another distant cell such as the cell 39 because it has the same cell identifier as the cell 36. In this example, the mobile station 22 detects a pilot signal from the cell 39. The mobile station 22 reports the detected cell identifier along with timing information regarding the detected signal from that cell to the radio base station 24 so that the information is provided to the network controller 30. The information that the network controller 30 receives is consistent with known detected cell reporting information that erroneously matches the detected cell identifier to the cell 36.

The network controller 30 will respond to the detected cell report by attempting to setup a radio link on radio base station 26 for the mobile station 22. Given that the cell 36 was not the actual detected cell, adding such a link may cause problems of the type described above. The illustrated example includes a method of controlling whether such a cell or radio link becomes part of an active set for the mobile station based on timing information regarding the detected cell. If at least one specified criterion is not satisfied, then the new radio link will be rejected and the erroneously detected cell 36 will be excluded from the monitored list of the controller 30 for the mobile station 22 while the mobile station 22 is being served by the current serving cell 34.

Figure 2:
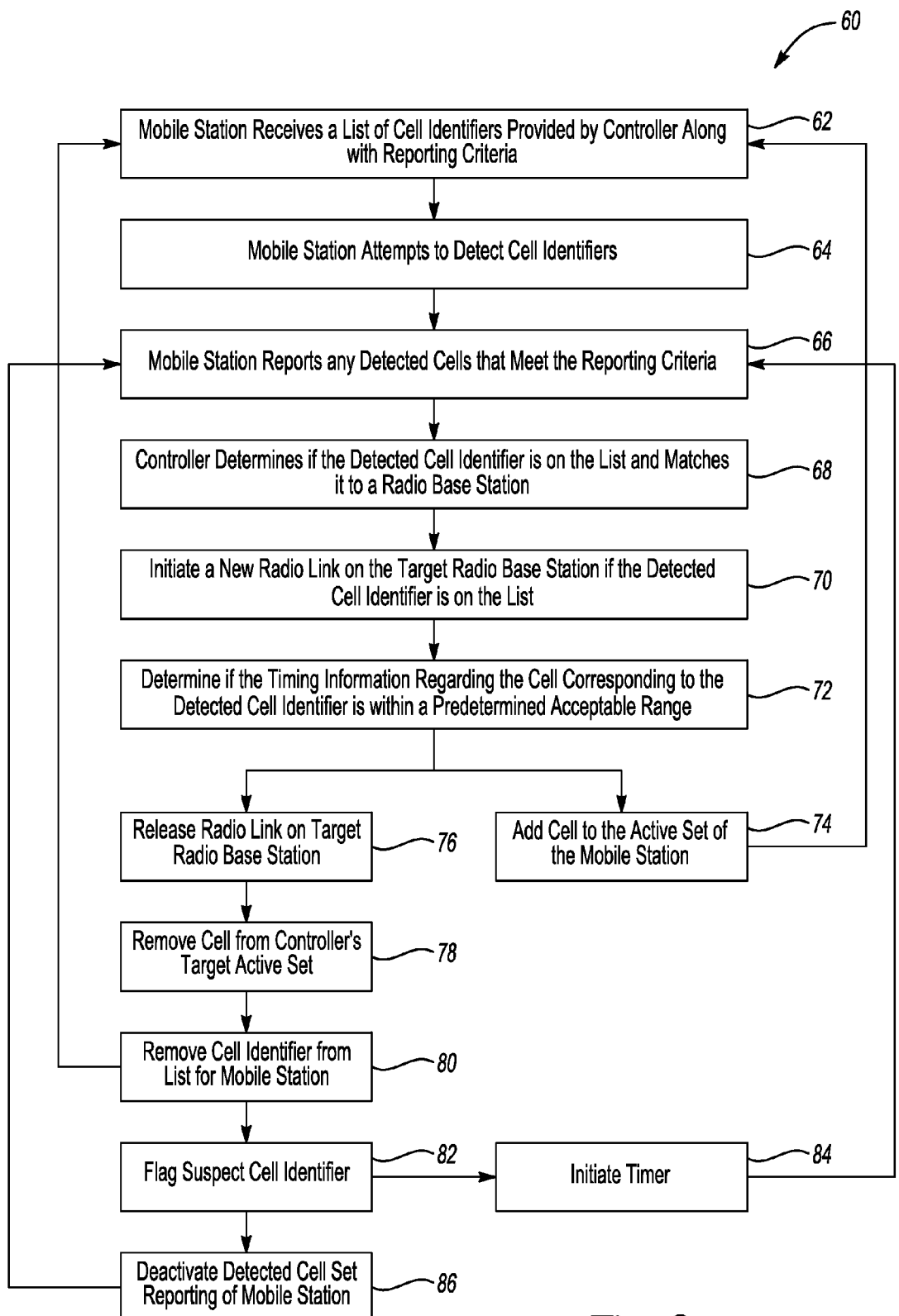
FIG. 2 is a flowchart diagram summarizing an example approach.

FIG. 2 includes a flowchart diagram 60 that summarizes an example approach. At 62, the mobile station 22 receives a list of cell identifiers provided by the network controller 30. The list comprises the target active set of the controller and indicates candidate cells (e.g., 36, 38) for possible communication with the mobile station 22. The list is monitored by the controller 30 and includes the cell identifiers of the possible candidate cells. At 64, the mobile station attempts to detect a signal from each of the cells indicated in the list. This may include the mobile station 22 detecting a pilot signal from a cell. The detected signal provides an indication of the cell identifier of the cell from which the signal originated.

At 66, the mobile station reports any detected cells to the serving cell 24. An indication received by the network controller 30 regarding a detected cell allows the controller 30 to determine at 68 whether a detected cell identifier is on the list provided to the mobile station 22. If a detected cell identifier matches with any of the cell identifiers on the list, the controller 30 initiates a new radio link between the mobile station 22 and the detected cell at 70. In this example, the new radio link is setup to the matched radio base station to attempt a soft handover of the mobile station 22 from the cell 24 to another cell.

At 72, the controller 30 receives the user plane timing adjustment for the new radio link (e.g., the radio link initiated at 70 is set up). One example includes determining whether user plane timing information regarding the added radio link satisfies at least one criterion. This is accomplished in the illustrated example by checking that the timing offset adjustment of the user plane for the new radio link reported by the radio base station is within an acceptable range. The radio base station determines the initial user plane timing adjustment when the radio link setup request is received from the controller which contains the mobile station reported cell frame number (CFN) and chip offset of the detected cell corresponding to the detected cell identity. In some examples, the acceptable range is predetermined by the controller 30 based on known geolocation information of the serving active set of cells and of neighboring cells. The timing adjustment reported by the radio base station is an indication of whether the new cell is in close proximity to the mobile station 22.

Each radio base station framing alignment is independent and the time offset adjustment is useful for determining if the controller matched the true radio base station to the corresponding cell identity detected by the mobile station. This is because the CFN and chip offset measured by the mobile station over the air interface should only be offset by the relatively small transmission and processing delays plus a radio propagation delay. It follows that large user plane time adjustments indicate either that the controller erroneously matched the detected cell identity to a radio base station or that the distance between the radio base station and mobile station is very large.

The cell corresponding to the detected cell is allowed to be added into the active set of the mobile station 22 only if the determined user plane timing adjustment information is within the predetermined acceptable range. This is shown at 74 in FIG. 2. If the determined timing information is not within the acceptable range, then the controller requests the target radio base station to release the radio link at 76. The detected cell is removed from the target active set of the controller at 78 and the active set in the mobile station remains at a state that existed prior to the mobile station detecting the cell identity at 66.

One feature of the illustrated example is that the detected cell identifier is removed from the monitored list of cell identifiers that the mobile station is supposed to attempt to detect as candidates responsive to determining that the timing information is outside of the acceptable range. This is shown at 80 in FIG. 2. The cell identifier is flagged by the controller 30 at 82 as suspect because of the previous determination regarding the timing information of the detected cell. A suspect cell identifier will be rejected or not considered as a potential candidate target cell identifier for a selected time period. In one example, the suspect cell identifier is disregarded by the controller 30 for a remainder of the current call. A timer is set at 84 in the illustrated example. If the same cell identifier is detected by the mobile station 22 (e.g., because the mobile station detected a signal from the cell 36, which has that cell identifier) and the timer is not yet expired, the controller 30 ignores that detected cell identifier. This reduces processing associated with repeatedly setting up and then rejecting a detected cell that is too far away or matched erroneously to a radio base station that has a reused cell identifier.

Another feature of the example of FIG. 2 is that a detected cell set reporting functionality of the mobile station is disabled at 86. In one example, the controller 30 provides an indication that the mobile station 22 should turn off such functionality responsive to having determined that a cell was reported that cannot be included in the active set for the mobile station under the current conditions. The mobile station 22 responds to such an indication by deactivating the detected cell set functionality until a prescribed event occurs (e.g., a timer value expires, a handover is completed or the call is terminated). In one example, when the timer set at 84 expires, the mobile station is allowed to turn the detected cell set functionality back on.

The above example approach allows a controller (such as a RNC) to detect erroneous measurement reports for cells or sectors that have the same identifier as the cells or sectors legitimately included in a list of potential candidate target cells provided to a mobile station. Reducing or eliminating the inclusion of relatively far away cells from a mobile station's active set can increase the call retention rate even under conditions where a mobile station is likely to detect a relatively far away cell or sector having the same identifier as an identifier on a legitimate search list for the mobile station. Reducing dropped calls by increasing call retention in this way enhances the quality of service provided to customers.

The preceding description is exemplary rather than limiting in nature. Variations and modifications to the disclosed examples may become apparent to those skilled in the art that do not necessarily depart from the scope of legal protection given to this invention, which can only be determined by studying the following claims.

I claim:

1. A method of controlling wireless communications, comprising the steps of:

providing a list of cell identifiers to a mobile station, the list comprising a target active set of a controller that indicates candidate cells for possible communication with the mobile station;

receiving an indication from the mobile station that the mobile station has detected a cell identifier on the provided list;

determining whether timing information regarding the cell corresponding to the detected cell identifier is within a predetermined acceptable range; and allowing the cell corresponding to the detected cell identifier to remain in the target active set of the controller and to be added to an active set of the mobile station only if the determined timing information is within the predetermined acceptable range.

2. The method of claim 1, wherein the timing information comprises a cell frame number (CFN) offset.

3. The method of claim 1, wherein the timing information comprises a chip offset.

4. The method of claim 1, wherein the timing information comprises a user plane timing adjustment.

5. The method of claim 1, wherein the predetermined acceptable range is based on an expected relationship between the timing information measured by the mobile station and timing information reported by the base station of the cell having the detected cell identifier.

6. The method of claim 5, wherein the predetermined acceptable range comprises the user plane timing adjustment that is reported by the radio base station in response to a radio link setup request which included a cell frame number and chip offset measured by the mobile station.

7. The method of claim 6, wherein determining whether the timing information is within the predetermined acceptable range comprises determining whether the user plane timing adjustment is within the predetermined acceptable range.

8. The method of claim 1, wherein the predetermined acceptable range is indicative of a distance between base stations.

9. The method of claim 1, wherein the cell identifiers comprise primary scrambling codes.

10. The method of claim 1, comprising
removing the detected cell identifier from the provided list for the mobile station for at least a selected time responsive to determining that the determined timing information is outside of the predetermined acceptable range.

11. The method of claim 10, comprising
establishing a time period during which the detected cell identifier will be prevented from being included in the target active set of the controller; and
preventing the detected cell identifier from being included in the target active set responsive to a subsequent receipt of the detected cell identifier from the mobile station if the time period has not yet expired.

12. The method of claim 1, comprising
instructing the mobile station to turn off a cell set reporting functionality of the mobile station at least while the provided list is being used by the mobile station.

13. The method of claim 1, wherein the determined timing information being within the predetermined acceptable range indicates that the cell corresponding to the detected cell identifier is the candidate cell in the target active set having the detected cell identifier.

14. A method of communicating, comprising the steps of:
receiving a list of cell identifiers at a mobile station, the list comprising a target active set of a controller that indicates candidate cells for possible communication with the mobile station;
detecting at least one of the cell identifiers from the list;
providing an indication that the mobile station has detected the at least one cell identifier; and
attempting to establish a communication link with the base station of the cell having the detected cell identifier when the cell is included in an active set for the mobile station responsive to timing information regarding the cell corresponding to the detected cell identifier being within an acceptable range.

15. The method of claim 14, comprising
attempting a soft handover to the cell corresponding to the detected cell identifier.

16. The method of claim 14, wherein the timing information comprises a cell frame number (CFN) offset.

17. The method of claim 14, wherein the timing information comprises a cell chip offset.

18. The method of claim 14, wherein the timing information comprises user plane timing adjustment information.

19. The method of claim 14, wherein the predetermined acceptable range is indicative of a distance between base stations.

20. The method of claim 14, wherein the cell identifiers comprise primary scrambling codes.

21. The method of claim 14, comprising
removing the detected cell identifier from the received list for at least a selected time responsive to a corresponding indication from the provider of the received list.

22. The method of claim 14, comprising
turning off a cell set reporting functionality of the mobile station at least while the received list is being used by the mobile station responsive to a corresponding indication from the provider of the received list.

23. The method of claim 14, wherein the timing information regarding the cell corresponding to the detected cell identifier being within the acceptable range indicates that the cell corresponding to the detected cell identifier is the candidate cell in the target active set having the detected cell identifier.

* * * * *